United States Patent
Wu et al.

(10) Patent No.: US 12,222,141 B2
(45) Date of Patent: Feb. 11, 2025

(54) HEAT TRANSFER SYSTEM AND METHOD FOR OPERATING A HEAT TRANSFER SYSTEM

(71) Applicant: Mitsubishi Electric Corporation, Tokyo (JP)

(72) Inventors: Duan Wu, Livingston (GB); Georgeanna Kawaley, Livingston (GB); James Freeman, Livingston (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 285 days.

(21) Appl. No.: 17/687,684

(22) Filed: Mar. 7, 2022

(65) Prior Publication Data

US 2022/0316772 A1    Oct. 6, 2022

(30) Foreign Application Priority Data

Mar. 31, 2021   (EP) ..................... 21166193

(51) Int. Cl.
*F25B 29/00* (2006.01)
*F24F 5/00* (2006.01)
(Continued)

(52) U.S. Cl.
CPC .......... *F25B 29/003* (2013.01); *F24F 5/0021* (2013.01); *F25B 9/06* (2013.01);
(Continued)

(58) Field of Classification Search
CPC ........ F25B 29/003; F25B 9/06; F25B 25/005; F25B 2400/14; F24F 5/0021; F24F 11/30;
(Continued)

(56) References Cited

U.S. PATENT DOCUMENTS

2020/0182558 A1*   6/2020   Alsadah .................. F25B 27/00

FOREIGN PATENT DOCUMENTS

| CN | 103748456 A | 4/2014 |
| CN | 111750558 A | 10/2020 |

(Continued)

OTHER PUBLICATIONS

Extended European Search Report mailed on Oct. 5, 2021, received for EP Application 21166193.9, 11 pages.
(Continued)

*Primary Examiner* — Ana M Vazquez
(74) *Attorney, Agent, or Firm* — XSENSUS LLP

(57) ABSTRACT

In a heat transfer system and a method for operating a heat transfer system, a heat transfer fluid having a phase change material (PCM) circulates in a cooling circuit. A combined state of phase value of the heat transfer fluid is determined based on information obtained from a sensor system including a temperature sensor and an electrical resistance sensor realized as two separate sensors or as one combined temperature-and-electrical-resistance sensor. The system and method can securely and effectively prevent a possible blocking of the channels of an indoor heat exchanger of the system by solidified PCM and an unwanted deposition of solid PCM (crystals) on heat transfer surfaces of the indoor heat exchanger.

14 Claims, 10 Drawing Sheets

(51) Int. Cl.
    *F25B 9/06* (2006.01)
    *F25B 25/00* (2006.01)
    *F25D 11/00* (2006.01)
(52) U.S. Cl.
    CPC .......... *F25B 25/005* (2013.01); *F25D 11/006* (2013.01); *F25B 2400/14* (2013.01)
(58) Field of Classification Search
    CPC ......... F24F 11/64; F24F 11/83; F25D 11/006; F28D 20/028
    See application file for complete search history.

(56) References Cited

FOREIGN PATENT DOCUMENTS

| | | | |
|---|---|---|---|
| EP | 3715768 A1 | 9/2020 | |
| JP | 2002-311014 A | 10/2002 | |
| JP | 2003-55650 A | 2/2003 | |
| JP | 2007240130 A * | 9/2007 | ............. F28D 20/02 |
| JP | 2009-58199 A | 3/2009 | |
| WO | 2021/014644 A1 | 1/2021 | |

OTHER PUBLICATIONS

Chinese Office Action issued Jun. 29, 2023 in corresponding Chinese Patent Application No. 202210303907.X (with machine-generated English translation), 10 pages.

Chinese Office Action issued Mar. 6, 2024, in corresponding Chinese Patent Application No. 202210303907.X, 14pp.

Office Action dated Jul. 30, 2024 issued in corresponding JP patent application No. 2022-036119, 10pp.

* cited by examiner

HEAT TRANSFER SYSTEM AND METHOD FOR OPERATING A HEAT TRANSFER SYSTEM

CROSS-REFERENCE TO RELATED APPLICATION

This application is based upon and claims the benefit of priority of the prior European Patent Application No. 21166193.9, filed on Mar. 31, 2021, the entire contents of which are incorporated herein by reference.

DESCRIPTION

The invention provides a heat transfer system and a method for operating a heat transfer system in which a heat transfer fluid comprising or consisting of a phase change material (PCM) circulates in a cooling circuit. A combined state of phase value of the heat transfer fluid is determined based on information obtained from a sensor system which is located in the cooling circuit and which comprises or consists of a temperature sensor and an electrical resistance sensor realized as two separate sensors or as one combined temperature-and-electrical-resistance sensor. With "state of phase" the quality of the heat transfer fluid regarding the amount of crystallisation/solidification of its PCM is meant and gives information whether crystallisation within the heat transfer fluid is taking place. The system and method can securely and effectively prevent a possible blocking of the channels of an indoor heat exchanger of the system by solidified PCM and an unwanted deposition of solid PCM (crystals) on heat transfer surfaces of the indoor heat exchanger.

In static heat storage systems employing phase change materials (PCMs) or in dynamic heat transfer systems (i.e. flow systems) with an encapsulated PCM, the phase change process poses less of an issue compared to dynamic heat transfer systems (i.e. flow systems) with a non-encapsulated PCM because a phase change/crystallisation of a non-encapsulated PCM of a heat transfer fluid in narrow transport channels of the system can lead to blockage of a flow path or to an unwanted crystal deposition on heat transfer surfaces. An ability to accurately determine the state of phase (or charge) during PCM slurry flow would allow for better control of the transport system. Furthermore, it is desirable to manipulate the solid-liquid transition at specific points of the transport path to avoid the mentioned negative consequences.

A first challenge is the accurate determination of the state of charge/phase (SOC/P). Traditional direct methods in which temperature of the slurry flow is measured directly are not advantageous, particularly in cases where the phase transition temperature is approximately constant during the transition from liquid to solid/slurry and vice versa. In cases where the phase transition occurs over a broad temperature range, a measurement of the temperature as sole parameter will lead to inaccuracies in SOC/P determination.

Various methods for determination of SOC/P have been published or patented over the years. However, these are either very complicated or result in large error margins. For fully realizing the potential of PCM slurry in practical applications, more accurate and low cost methods are required for assessment of the state of phase in a heat transfer system.

Many single-component phase change materials used for non-flow type storage applications have a very narrow range of temperature during phase transition. As a result, temperature measurements of the PCM are of limited use for predicting their state of phase (SOP) during phase transition.

For avoiding this problem, it is known in the prior art to switch discretely between temperature and other thermophysical properties (e.g. pressure) according to whether the PCM state is inside or outside of the phase transition region. For phase change slurries such as TBAB, which undergo phase change across a small but non-negligible temperature range (~8° C. for 20% w/v TBAB), a temperature measurement in the phase transition region still provides useful information that can be used to predict the SOP. However, the determination accuracy is low.

JP 2007 240130 A discloses a heat storage device and a method for measuring a heat storage quantity that can accurately measure a heat storage quantity in a heat storage tank for storing heat through heat exchange between a heat storage medium and a refrigerant. The device and method actually employ a determined heat capacity ("heat storage quantity") of heat transfer fluid with a PCM for controlling the heat storage device, but do not employ a determined quality of the heat transfer fluid regarding the amount of crystallisation/solidification of its PCM for this purpose. Thus, the control and method disclosed in this document cannot prevent disadvantages connected to a crystallization/solidification of the PCM in the heat transfer fluid.

Starting therefrom, it was the objective of the invention to provide a heat transfer system and a method for operating a heat transfer system which does not have the disadvantage of prior art systems and methods. Specifically, the system and method should ensure a high accuracy of determining the quality of the heat transfer fluid used in the system and/or method regarding the amount of crystallisation/solidification of its PCM. Furthermore, the system and method should securely prevent narrow flow channels within an indoor heat exchanger used in the system and method from being blocked by solid phase change material and should prevent heat transfer surfaces of an indoor heat exchanger used in the system and method from unwanted deposition of solid phase change material (crystals). Preferably, the system and method should also ensure that the amount of cooling delivered to the indoor heat exchanger is (linearly) dependent on the flow rate of the heat transfer fluid into said indoor heat exchanger.

The objective is solved by the heat transfer system according to claim 1 and by the method according to claim 9. The dependent claims illustrate advantageous embodiments.

According to the invention, a heat transfer system is provided, comprising
a) a refrigeration circuit comprising a first heat transfer fluid, a compressor, a condenser, an expansion device and an outdoor heat exchanger;
b) a cooling circuit comprising a second heat transfer fluid, which comprises or consists of a phase change material, a pump for circulating the second heat transfer fluid around the cooling circuit, a heat exchanger for transferring heat from the second heat transfer fluid to the first heat transfer fluid, and at least one indoor heat exchanger for transferring heat from a space to be cooled to the second heat transfer fluid;
c) in the cooling circuit, a sensor system comprising or consisting of a temperature sensor and an electrical resistance sensor, wherein the temperature sensor and the electrical resistance sensor are realized as two separate sensors or as one combined temperature-and-electrical-resistance sensor;

d) a controller configured to obtain temperature information and electrical resistance information from the sensor system;

wherein the controller is configured to determine a combined state of phase value ($SOP_{flow}$) based on the obtained temperature information and obtained electrical resistance information, and control the operation of the heat transfer system based on the determined combined state of phase value ($SOP_{flow}$).

The configuration of the controller to determine a combined state of phase value ($SOP_{flow}$) based on the obtained temperature information and obtained electrical resistance information allows the controller to determine the SOP of the heat transfer fluid in the phase transition region of the PCM with a higher accuracy than if only the temperature or only the electrical resistance of the heat transfer fluid were used for determining the SOP of the heat transfer fluid.

According to the invention, the term "state of phase" does not refer to the amount of remaining heat capacity of the PCM of the heat transfer fluid, but rather to the quality of the heat transfer fluid regarding the amount of crystallisation/ solidification of its PCM. Hence, the determination of the state of phase of the heat transfer fluid according to the invention allows the determination when a crystallisation of the PCM within the heat transfer fluid is taking place.

The control of the operation of the heat transfer system based on said determined SOP value allows the system to prevent blocking of the channels of the indoor heat exchanger and to prevent unwanted deposition of crystals on its heat transfer surface. The inventive system is simple and effective and does not need expensive instrumentation.

In the system, the temperature sensor of the sensor system can be selected from the group consisting of a thermocouple-based sensor, a thermistor sensor, a RTD-based sensor and combinations thereof. The electrical resistance sensor can be selected from the group consisting of a conductivity sensor (as resistance is the reciprocal of conductance), a calibrated RTD-based sensor and combinations thereof. The combined temperature-and-electrical-resistance sensor can be a calibrated RTD.

In the system, the PCM of the heat transfer fluid is preferably an unencasulated PCM. The PCM can comprise or consist of an inorganic PCM, preferably a salt, more preferably a clathrate hydrate. It has been found that the electrical resistance of clathrate hydrates (CHS), e.g. tetrabutylammonium bromide (TBAB) and trimethylolethane (TME), can be correlated to the SOP of clathrate hydrates.

The system can be characterized in that, to determine the combined state of phase value ($SOP_{flow}$), the controller is configured to
i) obtain a temperature ($T_{me}$) of the heat transfer fluid from the sensor system;
ii) obtain an electrical resistance ($R_{me}$) of the heat transfer fluid from the sensor system;
iii) determine a temperature component ($SOP_T$) of the state of phase (SOP) of the heat transfer fluid from the temperature ($T_{me}$);
iv) determine an electrical resistance component ($SOP_E$) of the state of phase (SOP) of the heat transfer fluid from the electrical resistance ($R_{me}$);
v) determine a weighted temperature component by calculating a product of the temperature component ($SOP_T$) and a temperature coefficient ($\beta$);
vi) determine a weighted electrical resistance component by calculating a product of the first electrical resistance component ($SOP_E$) and a difference between 1 and the temperature coefficient ($\beta$);
vii) determine the combined state of phase value ($SOP_{flow}$) by calculating the sum of the first weighted temperature component and the first weighted electrical resistance component.

The application of the temperature coefficient ($\beta$) to the temperature component ($SOP_T$) and the application of the difference between 1 and the temperature coefficient ($\beta$) (i.e. 1 minus $\beta$) to the electrical resistance component ($SOP_E$) for weighing said two components provides a continuous combined function applicable across the full two-phase region of the PCM.

The system can be characterized in that the sensor system is located upstream of the at least one indoor heat exchanger. The system can comprise a second sensor system located downstream of the at least one indoor heat exchanger, wherein the second sensor system comprises or consists of a temperature sensor and an electrical resistance sensor realized as two separate sensors or as one combined temperature-and-electrical-resistance sensor. In this case, the controller is configured to
i) obtain temperature information from the sensor system and second sensor system and obtaining electrical resistance information from the sensor system and second sensor system;
ii) determine a state of phase difference ($\Delta SOP$) of the heat transfer fluid across the at least one indoor heat exchanger based on the obtained temperature information and obtained electrical resistance information, and
iii) control the operation of the heat transfer system based on the determined state of phase difference ($\Delta SOP$).

The advantage of determining a state of phase difference ($\Delta SOP$) of the heat transfer fluid across the at least one indoor heat exchanger and the control of the operation of the system based on the determined $\Delta SOP$ is that it can be ensured that a cooling delivered to the indoor heat exchanger is (linearly) dependent on the flow rate of the heat transfer fluid. Thus, the cooling efficiency can be controlled more accurately.

For determining a state of phase difference ($\Delta SOP$) of the heat transfer fluid across the at least one indoor heat exchanger, the controller is preferably configured to
i) obtain a first temperature ($T_{me}$) of the heat transfer fluid from the sensor system and obtain a second temperature ($T_{me}$) of the heat transfer fluid from the second sensor system;
ii) obtain a first electrical resistance ($R_{me}$) of the heat transfer fluid from the sensor system and obtain a second electrical resistance ($R_{me}$) from the second sensor system;
iii) determine a first temperature component ($SOP_T$) of the state of phase (SOP) of the heat transfer fluid from the first temperature ($T_{me}$) and determine a second temperature component ($SOP_T$) of the state of phase (SOP) of the heat transfer fluid from the second temperature ($T_{me}$);
iv) determine a first electrical resistance component ($SOP_E$) of the state of phase (SOP) of the heat transfer fluid from the first electrical resistance ($R_{me}$) and determine a second electrical resistance component ($SOP_E$) of the state of phase (SOP) of the heat transfer fluid from the second electrical resistance ($R_{me}$);
v) determine a first weighted temperature component by calculating a product of the first temperature component ($SOP_T$) and a temperature coefficient ($\beta$) and determining a second weighted temperature component by calculating a product of the second temperature component ($SOP_T$) and the temperature coefficient ($\beta$);

vi) determine a first weighted electrical resistance component by calculating a product of the first electrical resistance component ($SOP_E$) and a difference between 1 and the temperature coefficient (β), and determining a second weighted electrical resistance component by calculating a product of the second electrical resistance component ($SOP_E$) and a difference between 1 and the temperature coefficient (β);

vii) determine the first combined state of phase value ($SOP_{flow}$) by calculating the sum of the first weighted temperature component and the first weighted electrical resistance component and determining a second combined state of phase value ($SOP_{return}$) by calculating the sum of the second weighted temperature component and the second weighted electrical resistance component;

viii) determine the state of phase difference (ΔSOP) of the heat transfer fluid across the at least one indoor heat exchanger by calculating the difference between the second state of phase value ($SOP_{return}$) and the first state of phase value ($SOP_{flow}$).

The system can be characterized in that the controller is configured to determine the temperature component ($SOP_T$) of the state of phase (SOP) of the heat transfer fluid as follows:

If $T_{me}>(T_{eq}+u(+))$, $SOP_T=0$;
If $T_{me}<(T_{eq}-u(-))$, $SOP_T=1$;
If $T_{me}≥((T_{eq}-u(-))$ and $≤(T_{eq}+u(+))$, $SOP_T$ is in the range of >0 and <1, preferably in the range of 0.1 to 0.9, more preferably in the range of 0.2 to 0.8, even more preferably in the range of 0.3 to 0.7, particularly preferably in the range of 0.4 to 0.6, especially 0.5;
wherein
$T_{me}$ is the value of the measured temperature,
$T_{eq}$ is the phase change temperature of the phase change material,
u(+) is a temperature deviation from the equilibrium temperature at the upper limit of phase change regime during the phase change process, e.g. melting,
u(−) is the temperature deviation from the equilibrium temperature at the lower limit of phase change regime during the phase change process, e.g. crystallization.

Furthermore, the system can be characterized in that the controller is configured to determine the electrical resistance component ($SOP_E$) of the state of phase (SOP) of the heat transfer fluid are determined as follows:

$$SOP_E=SOP_0+α·(R_{me}-R_0)$$

wherein
$SOP_0$ is a reference state of phase value, wherein, when the heat transfer fluid is a liquid without solid crystals present, $SOP_0$ is preferably 0,
α is a coefficient for converting the measured change in electrical resistance, relative to the reference resistance value $R_0$, to a state of phase
$R_{me}$ is the value of the measured electrical resistance,
$R_0$ is a reference resistance value.

Moreover, the system can be characterized in that the controller is configured to determine the combined state of phase value ($SOP_{flow}$, $SOP_{return}$) as follows:

$$SOP_{flow}, SOP_{return}=β·SOP_T+(1-β)·SOP_E$$

wherein
β is a coefficient representing a weighting value for a specific phase change material which provides the most accurate prediction of an enthalpy-based state of phase measurement, wherein β is preferably determined as follows:

If $T_{me}>(T_{eq}+u(+))$, β=1,
If $T_{me}<(T_{eq}-u(-))$, β=1,
If $T_{me}≥((T_{eq}-u(-))$ and $≤(T_{eq}+u(+))$, β is in the range of >0 and <1, preferably in the range of 0.01 to 0.8, more preferably in the range of 0.05 to 0.6, even more preferably in the range of 0.10 to 0.4, particularly preferably in the range of 0.15 to 0.3, especially 0.2,
wherein
$T_{me}$ is the value of the measured temperature,
$T_{eq}$ is the phase change temperature of the phase change material,
u(+) is a temperature deviation from the equilibrium temperature at the upper limit of phase change regime during the phase change process, e.g. melting,
u(−) is the temperature deviation from the equilibrium temperature at the lower limit of phase change regime during the phase change process, e.g. crystallization.

Besides, the system can be characterized in that the controller is configured to control the operation of the heat transfer system based on i) the determined combined state of phase value ($SOP_{flow}$) by controlling a speed of the compressor, preferably in dependence of the highest cooling load of an indoor heat exchanger in the system; and/or ii) a determined state of phase difference (ΔSOP) across the at least one heat exchanger by controlling a fan of the at least one indoor heat exchanger to be switched on or off (e.g. whether to be switched on at a predetermined rotation speed) and/or by controlling a flow rate of the heat transfer fluid through the at least one indoor heat exchanger, preferably by controlling a pump rate of the pump and/or an opening degree of a valve in fluid connection to said indoor heat exchanger.

In addition, the system can be characterized in that the cooling circuit comprises at least one further indoor heat exchanger, wherein a third sensor system is disposed downstream of said further indoor heat exchanger in the cooling circuit, wherein the third sensor system comprises or consists of a temperature sensor and an electrical resistance sensor realized as two separate sensors or as one combined temperature-and-electrical-resistance sensor, wherein the controller is configured to control the operation of the heat transfer system based on i) the determined combined state of phase value ($SOP_{flow}$) by controlling a speed of the compressor, preferably in dependence of the highest cooling load of an indoor heat exchanger in the system; and/or ii) a determined state of phase difference (ΔSOP) across the at least one further heat exchanger by controlling a fan of the at least one further indoor heat exchanger to be switched on or off (e.g. whether to be switched on at a predetermined rotation speed) and/or by controlling a flow rate of the heat transfer fluid through the at least one further indoor heat exchanger, preferably by controlling a pump rate of the pump and/or an opening degree of a valve in fluid connection to said at least one further indoor heat exchanger.

If the system is configured such that the temperature and pressure of the heat transfer fluid entering the further indoor heat exchanger is the same like that entering the indoor heat exchanger, the controller can be configured to determine a state of phase difference (ΔSOP) of the heat transfer fluid across the further indoor heat exchanger based on temperature information obtained from the sensor system and third sensor system and based on electrical resistance information obtained from the sensor system and third sensor system. If the system is configured such that the temperature and pressure of the heat transfer fluid entering the further indoor heat exchanger is different to that entering the indoor heat exchanger, the controller can be configured to determine a state of phase difference (ΔSOP) of the heat transfer fluid across the further indoor heat exchanger based on temperature information obtained from the third sensor system and a fourth sensor system and based on electrical resistance information obtained from the third sensor system and a fourth sensor system, wherein the fourth sensor system is disposed upstream of the further indoor heat exchanger in the cooling circuit and wherein the fourth sensor system comprises or consists of a temperature sensor and an electrical resistance sensor realized as two separate sensors or as one combined temperature-and-electrical-resistance sensor. The determination can be in analogy to the determination of the ΔSOP for the indoor heat exchanger described above.

According to the invention, a method for operating a heat transfer system in which a heat transfer fluid comprising or consisting of a phase change material circulates in a cooling circuit, the method comprising:

obtaining temperature information and electrical resistance information from a sensor system located in a cooling circuit of a heat transfer system in which a heat transfer fluid comprising or consisting of a phase change material circulates, wherein the sensor system comprises or consists of a temperature sensor and the electrical resistance sensor which are realized as two separate sensors or as one combined temperature-and-electrical-resistance sensor;

wherein the method comprises determining a combined state of phase value ($SOP_{flow}$) based on the based on the obtained temperature information and obtained electrical resistance information, and controlling the operation of the heat transfer system based on the determined state of phase value ($SOP_{flow}$).

The method according to the invention has the same advantages like the system according to the invention. Specifically, step of determining a combined state of phase value ($SOP_{flow}$) based on the obtained temperature information and obtained electrical resistance information allows the controller to determine the SOP of the heat transfer fluid in the phase transition region of the PCM with a higher accuracy than if only the temperature or only the electrical resistance of the heat transfer fluid were used for determining the SOP of the heat transfer fluid. The step of controlling the operation of the heat transfer system based on said determined value allows the method to prevent blocking of the channels of the indoor heat exchanger and to prevent unwanted deposition of crystals on its heat transfer surface. The inventive method is simple and effective and does not need expensive instrumentation.

In the system, the temperature sensor of the sensor system can be selected from the group consisting of a thermocouple-based sensor, a thermistor sensor, a RTD-based sensor and combinations thereof. The electrical resistance sensor can be selected from the group consisting of a conductivity sensor (as resistance is the reciprocal of conductance), a calibrated RTD-based sensor and combinations thereof. The combined temperature-and-electrical-resistance sensor can be a calibrated RTD.

In the method, the PCM of the heat transfer fluid is preferably an unencapsulated PCM. The PCM can comprise or consist of an inorganic PCM, preferably a salt, more preferably a clathrate hydrate. It has been found that the electrical resistance of clathrate hydrates (CHS), e.g. tetrabutylammonium bromide (TBAB) and trimethylolethane (TME), can be correlated to the SOP of clathrate hydrates.

The method can be characterized in that, for determining the combined state of phase value ($SOP_{flow}$), it comprises i) obtaining a temperature ($T_{me}$) of the heat transfer fluid from the sensor system ii) obtaining an electrical resistance ($R_{me}$) of the heat transfer fluid from the sensor system;

iii) determining a temperature component ($SOP_T$) of the state of phase (SOP) of the heat transfer fluid from the temperature ($T_{me}$);

iv) determining an electrical resistance component ($SOP_E$) of the state of phase (SOP) of the heat transfer fluid from the electrical resistance ($R_{me}$);

v) determining a weighted temperature component by calculating a product of the temperature component ($SOP_T$) and a temperature coefficient ($\beta$);

vi) determining a weighted electrical resistance component by calculating a product of the first electrical resistance component ($SOP_E$) an a difference between 1 and the temperature coefficient ($\beta$);

vii) determining the combined state of phase value ($SOP_{flow}$) by calculating the sum of the first weighted temperature component and the first weighted electrical resistance component.

Furthermore, the system can be characterized in that the sensor system is located upstream of the at least one indoor heat exchanger. The system can comprise a second sensor system located downstream of the at least one indoor heat exchanger, wherein the second sensor system comprises or consists of a temperature sensor and an electrical resistance sensor realized as two separate sensors or as one combined temperature-and-electrical-resistance sensor, wherein the method comprises i) obtaining temperature information from the sensor system and second sensor system and obtaining electrical resistance information from the sensor system and second sensor system;

ii) determining a state of phase difference (ΔSOP) of the heat transfer fluid across the at least one indoor heat exchanger based on the obtained temperature information and obtained electrical resistance information, and iii) controlling the operation of the heat transfer system based on the determined state of phase difference (ΔSOP).

The advantage of determining a state of phase difference (ΔSOP) of the heat transfer fluid across the at least one indoor heat exchanger and the control of the operation of the system based on the determined ΔSOP is that it can be ensured that a cooling delivered to the indoor heat exchanger is (linearly) dependent on the flow rate of the heat transfer fluid. Thus, the cooling efficiency can be controlled more accurately.

For determining a state of phase difference (ΔSOP), the method preferably comprises a) obtaining a first temperature ($T_{me}$) of the heat transfer fluid from the sensor system and obtaining a second temperature ($T_{me}$) of the heat transfer fluid from the second sensor system;

b) obtaining a first electrical resistance ($R_{me}$) of the heat transfer fluid from the sensor system and obtaining a second electrical resistance ($R_{me}$) from the second sensor system;

c) determining a first temperature component ($SOP_T$) of the state of phase (SOP) of the heat transfer fluid from the first temperature ($T_{me}$) and determining a second temperature component ($SOP_T$) of the state of phase (SOP) of the heat transfer fluid from the second temperature ($T_{me}$);

d) determining a first electrical resistance component ($SOP_E$) of the state of phase (SOP) of the heat transfer fluid from the first electrical resistance ($R_{me}$) and determining a second electrical resistance component ($SOP_E$) of the state of phase (SOP) of the heat transfer fluid from the second electrical resistance ($R_{me}$);

e) determining a first weighted temperature component by calculating a product of the first temperature component ($SOP_T$) and a temperature coefficient ($\beta$) and determining a second weighted temperature component by calculating a product of the second temperature component ($SOP_T$) and the temperature coefficient ($\beta$);

f) determining a first weighted electrical resistance component by calculating a product of the first electrical resistance component ($SOP_E$) and a difference between 1 and the temperature coefficient ($\beta$), and determining a second weighted electrical resistance component by calculating a product of the second electrical resistance component ($SOP_E$) and a difference between 1 and the temperature coefficient ($\beta$);

g) determining the first combined state of phase value ($SOP_{flow}$) by calculating the sum of the first weighted temperature component and the first weighted electrical resistance component and determining a second combined state of phase value ($SOP_{return}$) by calculating the sum of the second weighted temperature component and the second weighted electrical resistance component;

h) determining the state of phase difference ($\Delta SOP$) of the heat transfer fluid across the at least one indoor heat exchanger by calculating the difference between the second state of phase value ($SOP_{return}$) and the first state of phase value ($SOP_{flow}$).

The method can be characterized in that the temperature component ($SOP_T$) of the state of phase (SOP) of the heat transfer fluid is determined as follows:

If $T_{me} > (T_{eq}+u(+))$, $SOP_T=0$;
If $T_{me} < (T_{eq}-u(-))$, $SOP_T=1$;
If $T_{me} \geq ((T_{eq}-u(-))$ and $\leq (T_{eq}+u(+))$, $SOP_T$ is in the range of >0 and <1, preferably in the range of 0.1 to 0.9, more preferably in the range of 0.2 to 0.8, even more preferably in the range of 0.3 to 0.7, particularly preferably in the range of 0.4 to 0.6, especially 0.5;

wherein $T_{me}$ is the value of the measured temperature, $T_{eq}$ is the phase change temperature of the phase change material, $u(+)$ is a temperature deviation from the equilibrium temperature at the upper limit of phase change regime during the phase change process, e.g. melting, $u(-)$ is the temperature deviation from the equilibrium temperature at the lower limit of phase change regime during the phase change process, e.g. crystallization.

Furthermore, the method can be characterized in that the electrical resistance component ($SOP_E$) of the state of phase (SOP) of the heat transfer fluid are determined as follows:

$$SOP_E = SOP_0 + \alpha \cdot (R_{me} - R_0)$$

wherein $SOP_0$ is a reference state of phase value, wherein, when the heat transfer fluid is a liquid without solid crystals present, $SOP_0$ is preferably 0, $\alpha$ is a coefficient for converting the measured change in electrical resistance, relative to the reference resistance value $R_0$, to a state of phase $R_{me}$ is the value of the measured electrical resistance, $R_0$ is a reference resistance value.

Moreover, the method can be characterized in that the combined state of phase value ($SOP_{flow}$, $SOP_{return}$) are determined as follows:

$$SOP_{flow}, SOP_{return} = \beta \cdot SOP_T + (1-\beta) \cdot SOP_E$$

wherein $\beta$ is a coefficient relating to a weighting value for a specific phase change material which provides the most accurate prediction of an enthalpy-based state of phase measurement, wherein $\beta$ is preferably determined as follows:

If $T_{me} > (T_{eq}+u(+))$, $\beta=1$,
If $T_{me} < (T_{eq}-u(-))$, $\beta=1$,
If $T_{me} \geq ((T_{eq}-u(-))$ and $\leq (T_{eq}+u(+))$, $\beta$ is in the range of >0 and <1, preferably in the range of 0.01 to 0.8, more preferably in the range of 0.05 to 0.6, even more preferably in the range of 0.10 to 0.4, particularly preferably in the range of 0.15 to 0.3, especially 0.2, wherein $T_{me}$ is the value of the measured temperature, $T_{eq}$ is the phase change temperature of the phase change material, $u(+)$ is a temperature deviation from the equilibrium temperature at the upper limit of phase change regime during the phase change process, e.g. melting, $u(-)$ is the temperature deviation from the equilibrium temperature at the lower limit of phase change regime during the phase change process, e.g. crystallization.

Besides, the method can be characterized in that the operation of the heat transfer system is controlled based on i) the determined combined state of phase value ($SOP_{flow}$) by controlling a speed of the compressor, preferably in dependence of the highest cooling load of an indoor heat exchanger in the system; and/or ii) a determined state of phase difference ($\Delta SOP$) across the at least one heat exchanger by controlling a fan of the at least one indoor heat exchanger to be switched on or off (e.g. whether to be switched on at a predetermined rotation speed) and/or by controlling a flow rate of the heat transfer fluid through the at least one indoor heat exchanger, preferably by controlling a pump rate of the pump and/or an opening degree of a valve in fluid connection to said indoor heat exchanger.

In addition, the method can be characterized in that the cooling circuit comprises at least one further indoor heat exchanger, wherein a third sensor system is disposed downstream of said further indoor heat exchanger, wherein the third sensor system comprises or consists of a temperature sensor and an electrical resistance sensor realized as two separate sensors or as one combined temperature-and-electrical-resistance sensor, wherein the controller is configured to control the operation of the heat transfer system based on i) the determined combined state of phase value ($SOP_{flow}$) by controlling a speed of the compressor, preferably in dependence of the highest cooling load of an indoor heat exchanger in the system; and/or ii) a determined state of phase difference ($\Delta SOP$) across the at least one further heat exchanger by controlling a fan of the at least one further indoor heat exchanger to be switched on or off (e.g. whether to be switched on at a predetermined rotation speed) and/or by controlling a flow rate of the heat transfer fluid through the at least one further indoor heat exchanger, preferably by controlling a pump rate of the pump and/or an opening degree of a valve in fluid connection to said at least one further indoor heat exchanger.

If the temperature and pressure of the heat transfer fluid entering the further indoor heat exchanger is the same like that entering the indoor heat exchanger, a state of phase difference ($\Delta$SOP) of the heat transfer fluid across the further indoor heat exchanger can be determined based on temperature information obtained from the sensor system and third sensor system and based on electrical resistance information obtained from the sensor system and third sensor system. If the temperature and pressure of the heat transfer fluid entering the further indoor heat exchanger is different to that entering the indoor heat exchanger, a state of phase difference ($\Delta$SOP) of the heat transfer fluid across the further indoor heat exchanger can be determined based on temperature information obtained from the third sensor system and a fourth sensor system and based on electrical resistance information obtained from the third sensor system and a fourth sensor system, wherein the fourth sensor system is disposed upstream of the further indoor heat exchanger in the cooling circuit and wherein the fourth sensor system comprises or consists of a temperature sensor and an electrical resistance sensor realized as two separate sensors or as one combined temperature-and-electrical-resistance sensor. The determination can be in analogy to the determination of the $\Delta$SOP for the indoor heat exchanger described above.

With reference to the following figures and examples, the subject-matter of the invention shall be illustrated in more detail without the wish to limit the invention to the specific embodiments shown here.

EXAMPLE 1—DETERMINATION OF PROPERTIES OF THE PCM TBAB

Figure 1:
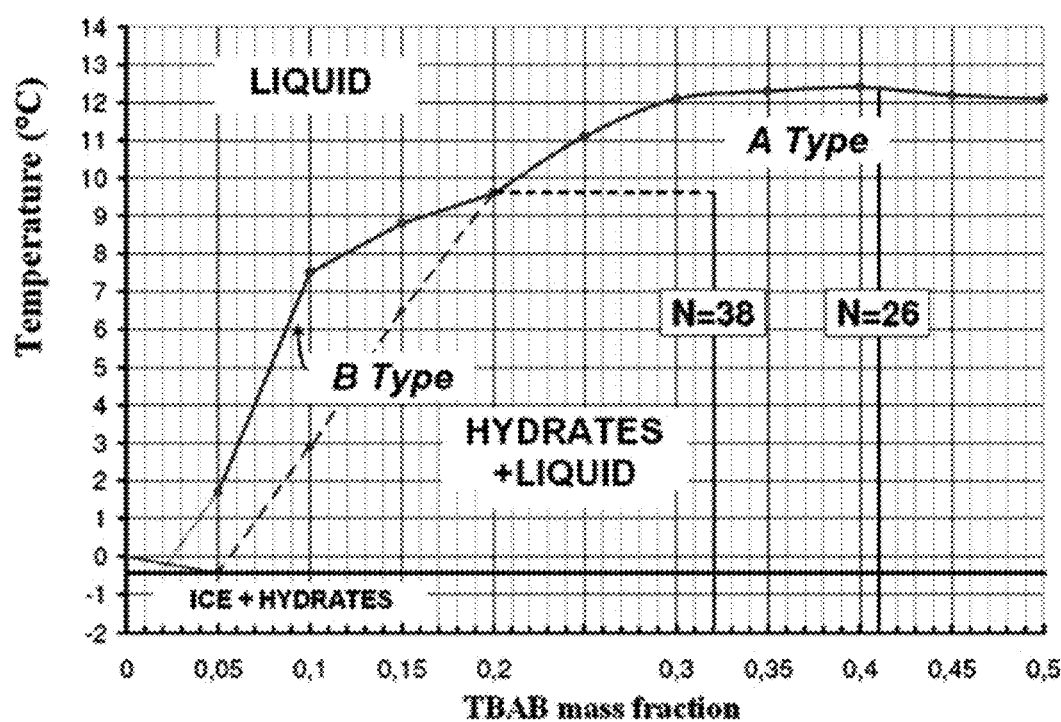
FIG. 1 shows a phase diagram of the PCM TBAB.
Figure 2:
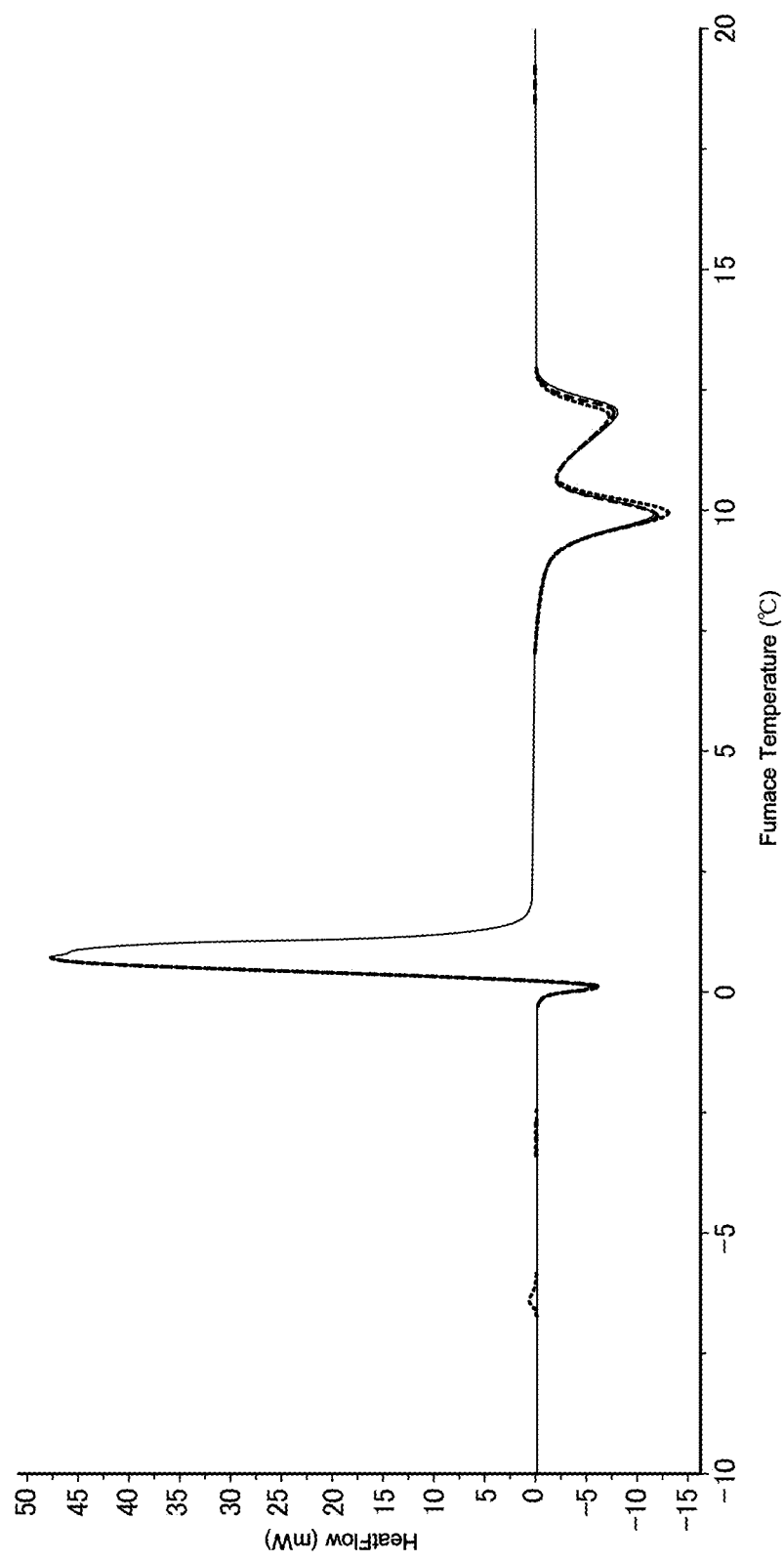
FIG. 2 shows a heat flow curve of the PCM TBAB determined by DSC.

A traditional Differential Scanning Calorimeter (DSC) was used to determine the phase change temperature of the PCM TBAB. The result is illustrated in FIG. 2.

Figure 3:
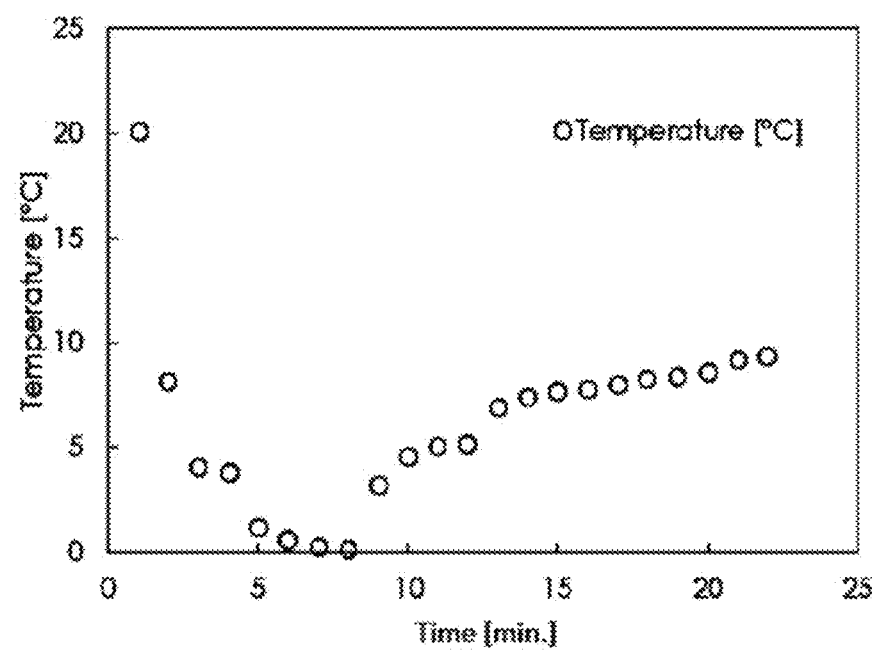
FIG. 3 shows the results of an electrical conductance measurement and temperature measurement with the PCM TBAB at various points in time over time. The x-axis of the plots of FIG. 3 represents the time (in minutes) and gives the time points at which measurement points were taken.
Figure 3:
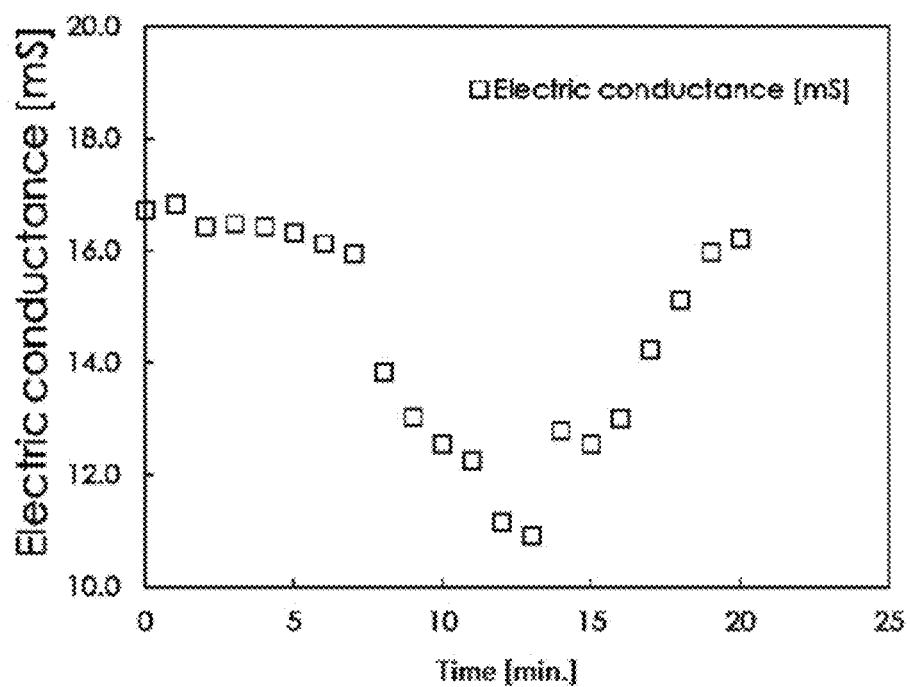
Figure 4:
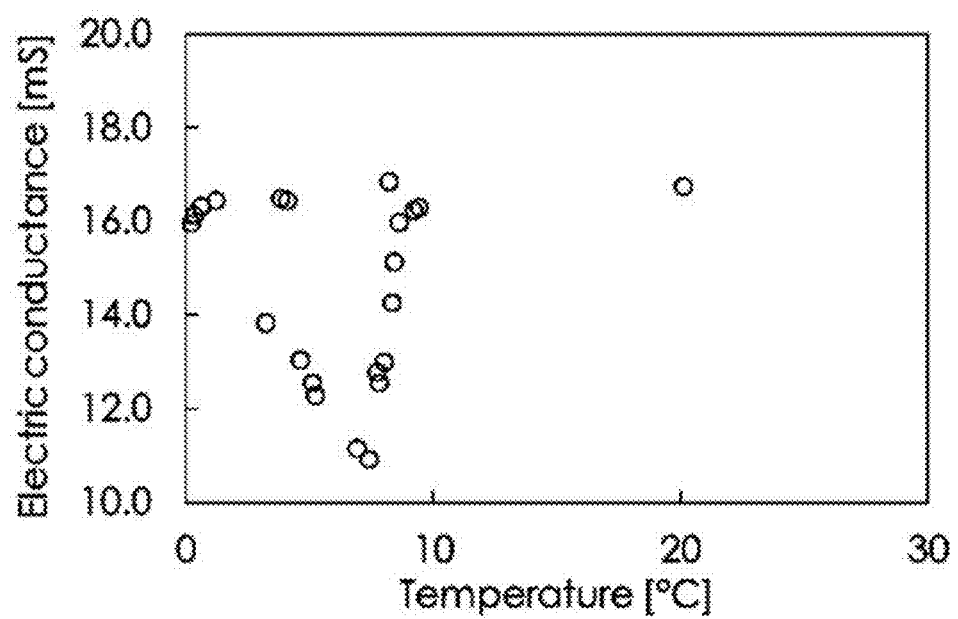
FIG. 4 shows a plot of the electrical conductance (y-axis) vs. the temperature (x-axis) which resulted from an electrical conductance measurement and temperature measurement with the PCM TBAB over time.
Figure 5:
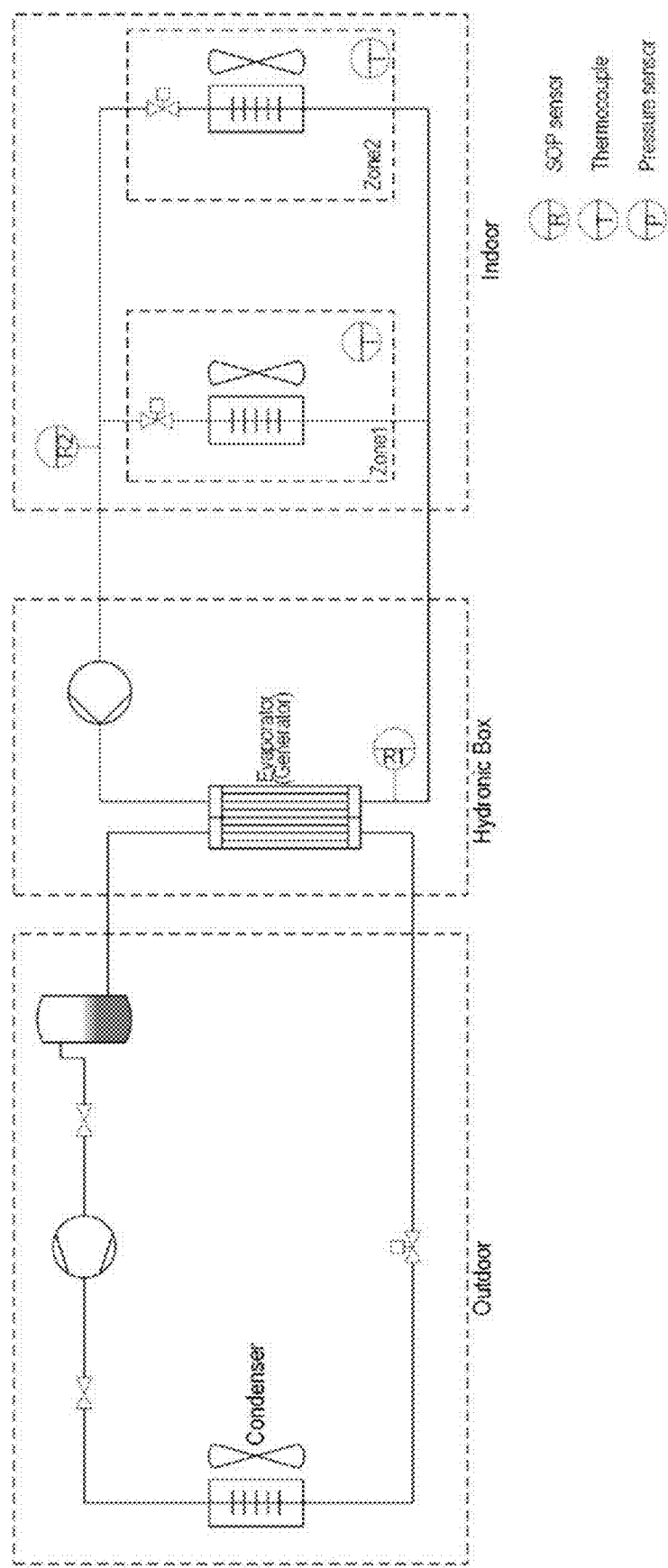
FIG. 5 shows a heat transfer system without a storage device.
Figure 6:
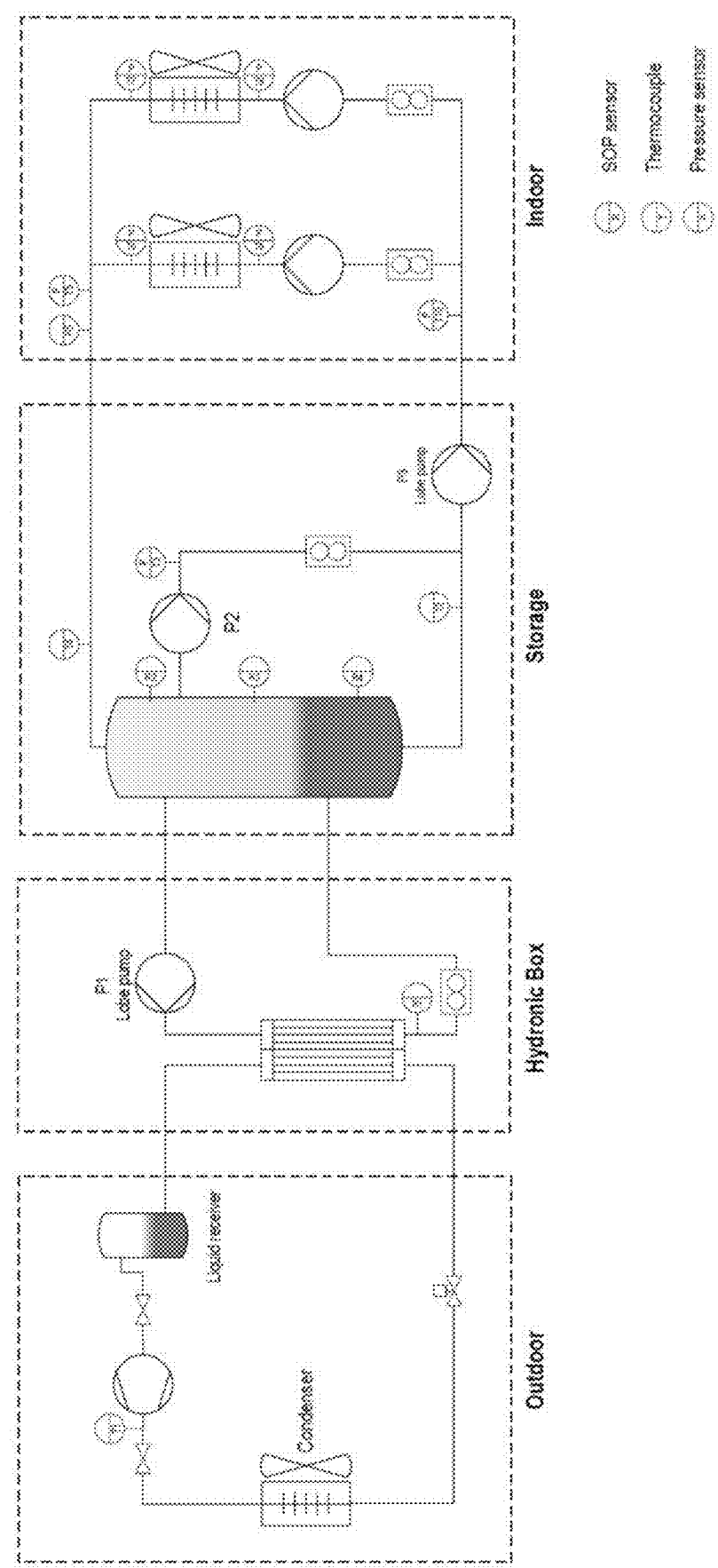
FIG. 6 shows a heat transfer system with a storage device.

An electrical conductance measurement and temperature measurement was performed to determine SOC/P. To this end, a 20 wt.-% TBAB in water solution was held in a thermostatic bath for regulating the temperature and a conductivity probe was used to measure electrical conductance. The measurement results are shown in FIG. 3 and were used to draw an electric conductance vs. temperature plot which is shown in FIG. 4. It is worth noting that the electrical conductance vs. temperature plot shown in FIG. 4 indicates the relationship between both parameters are not clear. It could suggest the temperature has limitation to interpret the state of phase in the phase change transition period.

EXAMPLE 2—DETERMINATION OF COEFFICIENTS $\alpha$ AND $\beta$ $\alpha$ is a coefficient for converting the measured change in electrical resistance, relative to the reference resistance value $R_0$, to a state of phase.

$\beta$ is a coefficient representing a weighting value for a specific phase change material which provides the most accurate prediction of an enthalpy-based state of phase measurement. $\beta$ can be determined as follows:

If $T_{me}>(T_{eq}+u(+))$, $\beta=1$,
If $T_{me}<(T_{eq}-u(-))$, $\beta=1$,
If $T_{me}\geq((T_{eq}-u(-))$ and $\leq(T_{eq}+u(+))$, $\beta$ is in the range of $>0$ and $<1$, preferably in the range of 0.01 to 0.8, more preferably in the range of 0.05 to 0.6, even more preferably in the range of 0.10 to 0.4, particularly preferably in the range of 0.15 to 0.3, especially 0.2, wherein $T_{me}$ is the value of the measured temperature,
$T_{eq}$ is the phase change temperature of the phase change material,
u(+) is a temperature deviation from the equilibrium temperature at the upper
limit of phase change regime during the phase change process, e.g. melting,
u(−) is the temperature deviation from the equilibrium temperature at the
lower limit of phase change regime during the phase change process, e.g. crystallization.

In order to fit the coefficients $\alpha$ and $\beta$ for a heat transfer fluid with a specific PCM, a state of phase based on enthalpy can be plotted as a function of bulk temperature and electrical resistance. To this end, a series of tests can be performed to measure the heating curve of the heat transfer fluid with a specific PCM in the phase change region.

EXAMPLE 3—METHOD FOR OPERATING A HEAT TRANSFER SYSTEM

Figure 7:
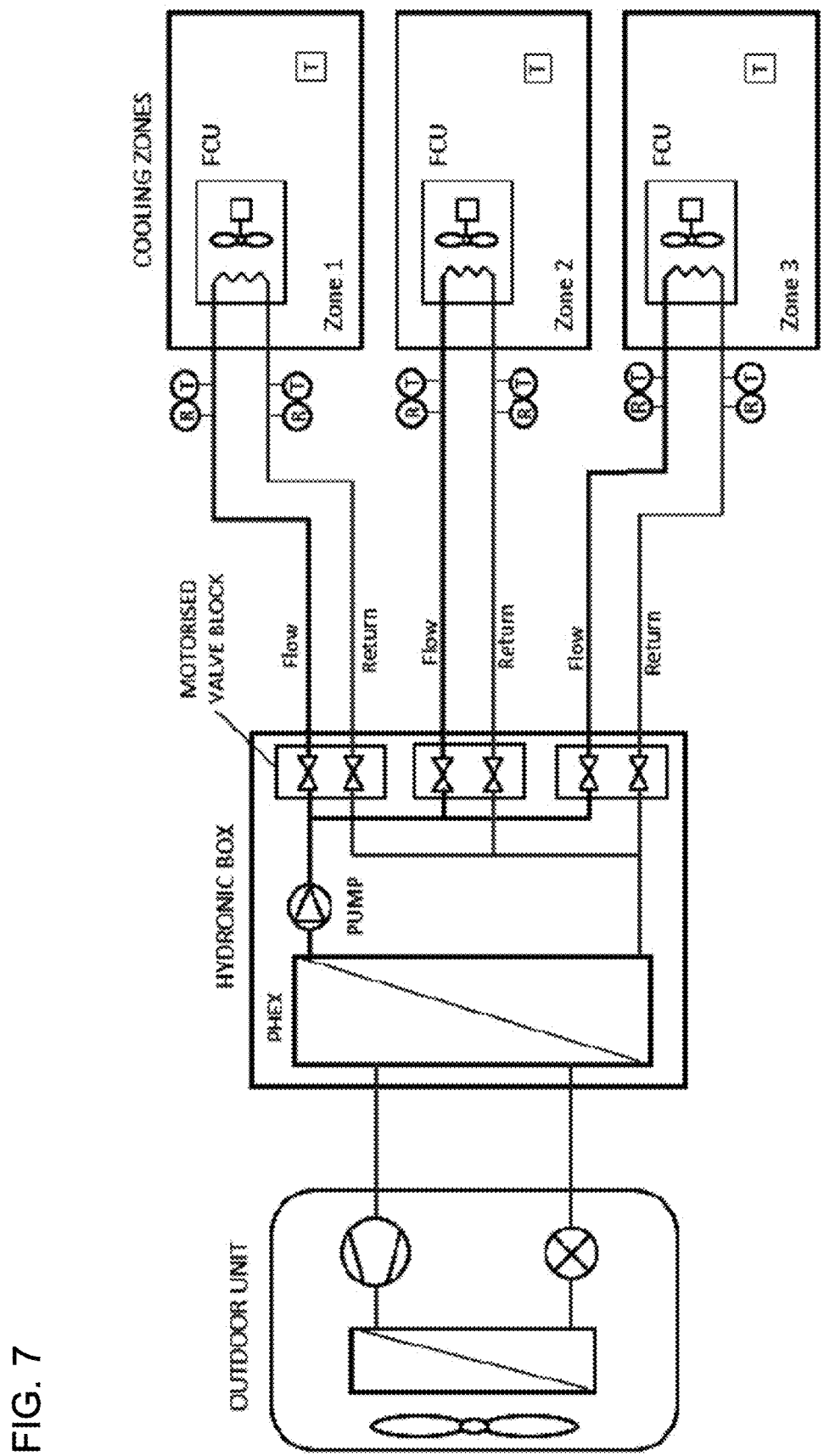
FIG. 7 shows a heat transfer system with different zones.

For operating a heat transfer system, control algorithms can be defined based on following assumptions for the example of the heat transfer system illustrated in the FIG. 7:
1. There are two or more indoor unit (fan coil units), each one serves its own thermal zone (i.e. room) which has its own thermostat measuring the room temperature;
2. The main components which are available for system control are the indoor unit fan, branch valves, compressor speed and slurry pump speed;
3. The state of phase (SOP) of the slurry is determined as a function of measured electrical resistance (R) and temperature (T);
4. For each room/zone, roughly the same target $\Delta$SOP across each indoor unit is required. This means that the cooling delivered to each zone varies (linearly) with the mass flow rate of slurry to each zone.

Figure 8:
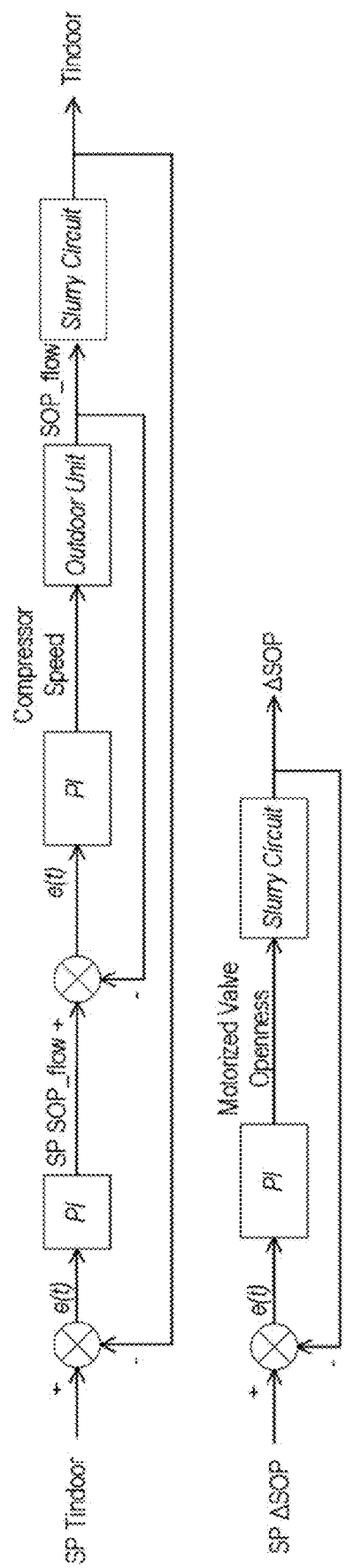
FIG. 8 shows a control diagram for the zone of the system with the highest cooling load.

For the zone with highest cooling load, the main algorithm can be explained as follows (see also FIG. 8 using PI as the example control mechanism):
Indoor unit fan is always on at a fixed speed (selected by occupant);

Compressor speed is adjusted automatically to achieve target SOP$_{flow}$. Target SOP$_{flow}$ is set according to ΔT between room set point and actual room temperature;

Valve position on indoor unit branch (either diverting/bypass valve or regulated ball valve) set according to the branch's target flow-rate. Target flow-rate to indoor unit set to achieve target ΔSOP.

Figure 9:
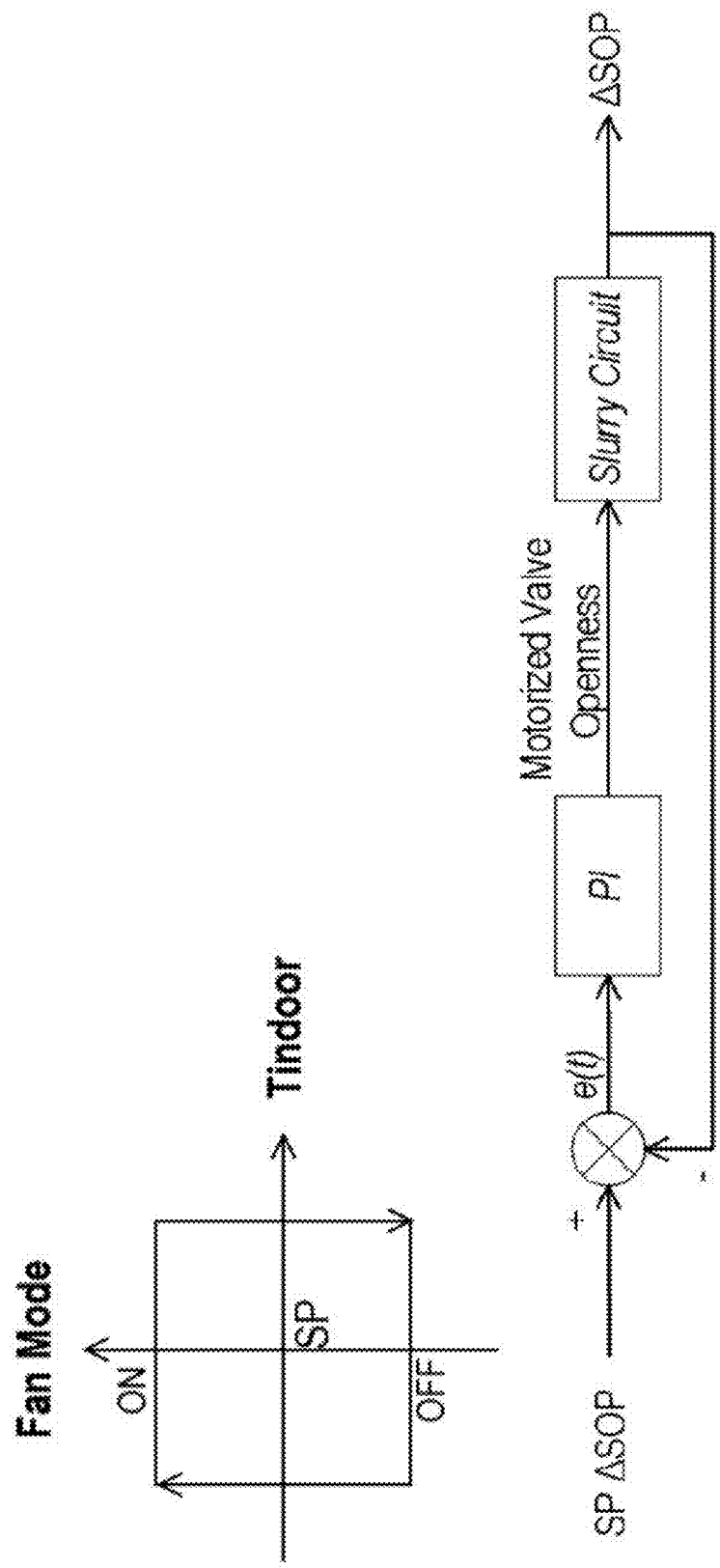
FIG. 9 shows a control diagram for zones of the system with a lower cooling load than the highest cooling load.

For zones with lower cooling load, the main algorithm can be explained as follows (see also FIG. 9):

Indoor unit fan switches on or off according to thermostat to maintain room temperature with deadband;

SOP$_{flow}$ to indoor unit is fixed according to the zone with the highest cooling load;

Valve position on indoor unit branch set according to the branch's target flow-rate. Target flow-rate to indoor unit set to achieve target ΔSOP.

Figure 10:
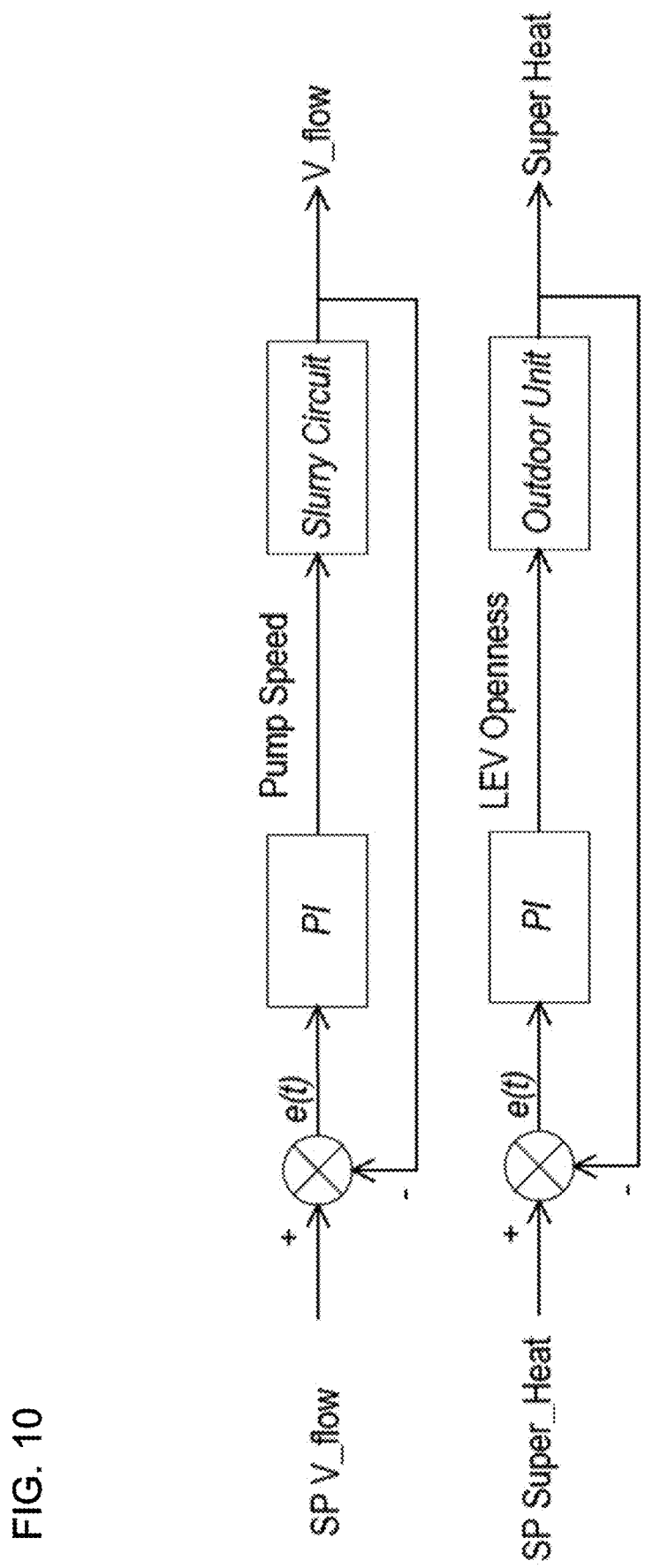
FIG. 10 shows a control diagram for a rest of the system (outdoor unit/hydronic box) of the system.

For the rest of the system (outdoor unit/hydronic box), the main control algorithm can be explained as follows (see also FIG. 10):

Pump speed set to achieve target slurry flow-rate in indoor heat exchanger (PH EX);

Valve (LEV) openness set to achieve target superheat on refrigerant side.

LIST OF REFERENCE SIGNS AND ABBREVIATIONS

PCM: phase change material;
SOP: state of phase of the heat transfer fluid with the PCM;
SOP$_{flow}$: first combined state of phase value of SOP upstream of an indoor heat exchanger;
SOP$_{return}$: second combined state of phase value of SOP downstream of an indoor heat exchanger;
ΔSOP: SOP$_{return}$–SOP$_{flow}$;
T$_{me}$: temperature of the heat transfer fluid;
T$_{eq}$: phase change temperature of the PCM;
R$_{me}$: measured electrical resistance of the heat transfer fluid;
R$_0$: a reference resistance value;
SOP$_T$: temperature component of the SOP;
SOP$_E$: electrical resistance component of the SOP;
SOP$_0$: a reference state of phase value, wherein, when the heat transfer fluid is a liquid without solid crystals present;
α: an electrical coefficient, for converting the measured change in electrical resistance, relative to the reference resistance value R$_0$, to a state of phase;
β: a temperature coefficient;
u(+): temperature deviation from the equilibrium temperature at the upper limit of phase change regime during the phase change process, e.g. melting;
u(−): temperature deviation from the equilibrium temperature at the lower limit of phase change regime during the phase change process, e.g. crystallization;
TBAB: tetrabutylammonium bromide;
TME: trimethylolethane;
R: SOP sensor, i.e. both a temperature and an electrical resistance sensor;
T: thermocouple;
P: pressure sensor;
PHEX: plate heat exchanger;
FCU: fan coil unit;
T$_{indoor}$: indoor temperature;
LEV: linear expansion valve;
RTD: resistance temperature detector;
SP: set-point;
e(t): error value as the difference between a desired setpoint and a measured process variable;
PI: proportional-integral controller;
V_flow: volumetric flow rate;
Super_Heat: Superheat is measured as the difference between the actual temperature of refrigerant vapour and the saturation temperature of the refrigerant.

The invention claimed is:

1. Heat transfer system, comprising
a) a refrigeration circuit comprising a first heat transfer fluid, a compressor, a condenser, and an outdoor heat exchanger;
b) a cooling circuit comprising a second heat transfer fluid, which comprises or consists of a phase change material, a pump for circulating the second heat transfer fluid around the cooling circuit, a heat exchanger for transferring heat from the second heat transfer fluid to the first heat transfer fluid, and at least one indoor heat exchanger for transferring heat from a space to be cooled to the second heat transfer fluid;
c) in the cooling circuit, a sensor system comprising or consisting of a temperature sensor and an electrical resistance sensor, wherein the temperature sensor and the electrical resistance sensor are realized as two separate sensors or as one combined temperature-and-electrical-resistance sensor;
d) a controller configured to obtain temperature information and electrical resistance information from the sensor system;
wherein the controller is configured to
determine a combined state of phase value (SOP$_{flow}$) based on the obtained temperature information and obtained electrical resistance information,
control an operation of the heat transfer system based on
i) the determined combined state of phase value (SOP$_{flow}$) by controlling a speed of the compressor or controlling the speed of the compressor in dependence of a highest cooling load of an at least one indoor heat exchanger in the system; or
ii) a determined state of phase difference (ΔSOP) across the at least one indoor heat exchanger by controlling a rotation speed of a fan of the at least one indoor heat exchanger, or by controlling a flow rate of the heat transfer fluid through the at least one indoor heat exchanger, or by controlling the flow rate of the heat transfer fluid by controlling a pump rate of the pump, or by controlling an opening degree of a valve in fluid connection to said at least one indoor heat exchanger.

2. System according to claim 1, wherein, to determine the combined state of phase value (SOP$_{flow}$), the controller is configured to
i) obtain a temperature (T$_{me}$) of the heat transfer fluid from the sensor system;
ii) obtain an electrical resistance (R$_{me}$) of the heat transfer fluid from the sensor system;
iii) determine a temperature component (SOP$_T$) of a state of phase (SOP) of the heat transfer fluid from the temperature (T$_{me}$);
iv) determine an electrical resistance component (SOP$_E$) of the state of phase (SOP) of the heat transfer fluid from the electrical resistance (R$_{me}$);
v) determine a weighted temperature component by calculating a product of the temperature component (SOP$_T$) and a temperature coefficient (β);
vi) determine a weighted electrical resistance component by calculating a product of the electrical resistance component ($SOP_E$) and a difference between 1 and the temperature coefficient ($\beta$);

vii) determine the combined state of phase value ($SOP_{flow}$) by calculating the sum of the weighted temperature component and the weighted electrical resistance component.

3. System according to claim 2, wherein the controller is configured to determine the temperature component ($SOP_T$) of the state of phase (SOP) of the heat transfer fluid as follows:

If $T_{me}>(T_{eq}+u(+))$, $SOP_T=0$;
If $T_{me}<(T_{eq}-u(-))$, $SOP_T=1$;
If $T_{me}\geq((T_{eq}-u(-))$ and $\leq(T_{eq}+u(+))$, $SOP_T$ is in the range of >0 and <1, or in a range of 0.1 to 0.9, or in a range of 0.2 to 0.8, or in a range of 0.3 to 0.7, or in a range of 0.4 to 0.6, or equal to 0.5;
wherein
$T_{me}$ is the value of the measured temperature,
$T_{eq}$ is a phase change temperature of the phase change material,
u(+) is a temperature deviation from an equilibrium temperature at an upper limit of phase change regime during a phase change process,
u(−) is the temperature deviation from an equilibrium temperature at a lower limit of phase change regime during another phase change process.

4. System according to claim 2, wherein the controller is configured to determine the electrical resistance component ($SOP_E$) of the state of phase (SOP) of the heat transfer fluid are determined as follows:

$$SOP_E=SOP_0+\alpha\cdot(R_{me}-R_0)$$

wherein
$SOP_0$ is a reference state of phase value, wherein, when the heat transfer fluid is a liquid without solid crystals present, $SOP_0$ is 0,
$\alpha$ is a coefficient for converting a measured change in electrical resistance, relative to the reference resistance value $R_0$, to a state of phase,
$R_{me}$ is the value of the measured electrical resistance,
$R_0$ is a reference resistance value.

5. System according to claim 2, wherein the controller is configured to determine a combined state of phase value ($SOP_{flow}$, $SOP_{return}$) as follows:

$$SOP_{flow},SOP_{return}=\beta\cdot SOP_T+(1-\beta)\cdot SOP_E$$

wherein
$\beta$ is a coefficient representing a weighting value for a specific phase change material which provides the most accurate prediction of an enthalpy-based state of phase measurement, wherein $\beta$ is determined as follows:
If $T_{me}>(T_{eq}+u(+))$, $\beta=1$,
If $T_{me}<(T_{eq}-u(-))$, $\beta=1$,
If $T_{me}\geq((T_{eq}-u(-))$ and $\leq(T_{eq}+u(+))$, $\beta$ is in a range of >0 and <1, or in a range of 0.01 to 0.8, or in a range of 0.05 to 0.6, or in a range of 0.10 to 0.4, or in a range of 0.15 to 0.3, or equal to 0.2,
wherein
$T_{me}$ is the value of the measured temperature,
$T_{eq}$ is a phase change temperature of the phase change material,
u(+) is a temperature deviation from an equilibrium temperature at an upper limit of phase change regime during a phase change process,
u(−) is the temperature deviation from an equilibrium temperature at a lower limit of phase change regime during another phase change process.

6. System according to claim 1, wherein the sensor system is located upstream of the at least one indoor heat exchanger, wherein the system comprises a second sensor system located downstream of the at least one indoor heat exchanger, wherein the second sensor system comprises or consists of a temperature sensor and an electrical resistance sensor realized as two separate sensors or as one combined temperature-and-electrical-resistance sensor, wherein the controller is configured to i) obtain temperature information from the sensor system and second sensor system and obtaining electrical resistance information from the sensor system and second sensor system;

ii) determine a state of phase difference (ΔSOP) of the heat transfer fluid across the at least one indoor heat exchanger based on the obtained temperature information and obtained electrical resistance information, and iii) control the operation of the heat transfer system based on the determined state of phase difference (ΔSOP), wherein, to determine a state of phase difference (ΔSOP) of the heat transfer fluid across the at least one indoor heat exchanger, the controller is configured to i) obtain a first temperature ($T_{me}$) of the heat transfer fluid from the sensor system and obtain a second temperature ($T_{me}$) of the heat transfer fluid from the second sensor system;

ii) obtain a first electrical resistance ($R_{me}$) of the heat transfer fluid from the sensor system and obtain a second electrical resistance ($R_{me}$) from the second sensor system;

iii) determine a first temperature component ($SOP_T$) of the state of phase (SOP) of the heat transfer fluid from the first temperature ($T_{me}$) and determine a second temperature component ($SOP_T$) of the state of phase (SOP) of the heat transfer fluid from the second temperature ($T_{me}$);

iv) determine a first electrical resistance component ($SOP_E$) of the state of phase (SOP) of the heat transfer fluid from the first electrical resistance ($R_{me}$) and determine a second electrical resistance component ($SOP_E$) of the state of phase (SOP) of the heat transfer fluid from the second electrical resistance ($R_{me}$);

v) determine a first weighted temperature component by calculating a product of the first temperature component ($SOP_T$) and a temperature coefficient ($\beta$) and determining a second weighted temperature component by calculating a product of the second temperature component ($SOP_T$) and the temperature coefficient ($\beta$);

vi) determine a first weighted electrical resistance component by calculating a product of the first electrical resistance component ($SOP_E$) and a difference between 1 and the temperature coefficient ($\beta$), and determining a second weighted electrical resistance component by calculating a product of the second electrical resistance component ($SOP_E$) and a difference between 1 and the temperature coefficient ($\beta$);

vii) determine the combined state of phase value ($SOP_{flow}$) by calculating the sum of the first weighted temperature component and the first weighted electrical resistance component and determining a second combined state of phase value ($SOP_{return}$) by calculating the sum of the second weighted temperature component and the second weighted electrical resistance component;

viii) determine the state of phase difference (ΔSOP) of the heat transfer fluid across the at least one indoor heat exchanger by calculating the difference between the second state of phase value ($SOP_{return}$) and the first state of phase value ($SOP_{flow}$).

7. System according to claim 1, wherein the cooling circuit comprises at least one further indoor heat exchanger, wherein a third sensor system is disposed downstream of said further indoor heat exchanger in the cooling circuit, wherein the third sensor system comprises or consists of a temperature sensor and an electrical resistance sensor realized as two separate sensors or as one combined temperature-and-electrical-resistance sensor, wherein the controller is configured to control the operation of the heat transfer system based on
 a further determined state of phase difference ($\Delta SOP$) across the at least one further indoor heat exchanger by controlling a fan of the at least one further indoor heat exchanger to be switched on or off, or by controlling a flow rate of the heat transfer fluid through the at least one further indoor heat exchanger, or by controlling the flow rate of the heat transfer fluid by controlling a pump rate of the pump, or by controlling an opening degree of a valve in fluid connection to said at least one further indoor heat exchanger.

8. A method for operating a heat transfer system in which a heat transfer fluid comprising or consisting of a phase change material circulates in a cooling circuit, the method comprising
 obtaining temperature information and electrical resistance information from a sensor system located in the cooling circuit of the heat transfer system in which the heat transfer fluid comprising or consisting of the phase change material circulates, wherein the sensor system comprises or consists of a temperature sensor and an electrical resistance sensor which are realized as two separate sensors or as one combined temperature-and-electrical-resistance sensor;
 wherein the method further comprises
 determining a combined state of phase value ($SOP_{flow}$) based on the obtained temperature information and obtained electrical resistance information, and
 controlling the operation of the heat transfer system based on the determined state of phase value ($SOP_{flow}$)
 wherein the operation of the heat transfer system is controlled based on
 i) the determined combined state of phase value ($SOP_{flow}$) by controlling a speed of a compressor, or controlling the speed of the compressor in dependence of the highest cooling load of at least one indoor heat exchanger in the system; or
 ii) a determined state of phase difference ($\Delta SOP$) across the at least one heat exchanger by controlling a fan of the at least one indoor heat exchanger to be switched on or off, or by controlling a flow rate of the heat transfer fluid through the at least one indoor heat exchanger, or by controlling the flow rate of the heat transfer fluid through the at least one indoor heat exchanger by controlling a pump rate of the pump, or by controlling an opening degree of a valve in fluid connection to said at least one indoor heat exchanger.

9. Method according to claim 8, wherein, for determining the combined state of phase value ($SOP_{flow}$), the method comprises
 i) obtaining a temperature ($T_{me}$) of the heat transfer fluid from the sensor system;
 ii) obtaining an electrical resistance ($R_{me}$) of the heat transfer fluid from the sensor system;
 iii) determining a temperature component ($SOP_T$) of a state of phase (SOP) of the heat transfer fluid from the temperature ($T_{me}$);
 iv) determining an electrical resistance component ($SOP_E$) of the state of phase (SOP) of the heat transfer fluid from the electrical resistance ($R_{me}$);
 v) determining a weighted temperature component by calculating a product of the temperature component ($SOP_T$) and a temperature coefficient ($\beta$);
 vi) determining a weighted electrical resistance component by calculating a product of the electrical resistance component ($SOP_E$) an a difference between 1 and the temperature coefficient ( )
 vii) determining the combined state of phase value ($SOP_{flow}$) by calculating the sum of the weighted temperature component and the weighted electrical resistance component.

10. Method according to claim 9, wherein the temperature component ($SOP_T$) of the state of phase (SOP) of the heat transfer fluid is determined as follows:
 If $T_{me} > (T_{eq}+u(+))$, $SOP_T=0$;
 If $T_{me} < (T_{eq}-u(-))$, $SOP_T=1$;
 If $T_{me} \geq ((T_{eq}-u(-))$ and $\leq (T_{eq}+u(+))$, $SOP_T$ is in a range of $>0$ and $<1$, or in a range of 0.1 to 0.9, or in a range of 0.2 to 0.8, or in a range of 0.3 to 0.7, or in a range of 0.4 to 0.6, or equal to 0.5;
wherein
 $T_{me}$ is the value of the measured temperature,
 $T_{eq}$ is a phase change temperature of the phase change material,
 u(+) is a temperature deviation from an equilibrium temperature at an upper limit of phase change regime during a phase change process,
 u(−) is the temperature deviation from an equilibrium temperature at a lower limit of phase change regime during another phase change process.

11. Method according to claim 9, wherein the electrical resistance component ($SOP_E$) of the state of phase (SOP) of the heat transfer fluid are determined as follows:

$$SOP_E = SOP_0 + \alpha \cdot (R_{me} - R_0)$$

wherein
 $SOP_0$ is a reference state of phase value, wherein, when the heat transfer fluid is a liquid without solid crystals present, $SOP_0$ is 0,
 $\alpha$ is a coefficient for converting a measured change in electrical resistance, relative to the reference resistance value $R_0$, to a state of phase
 $R_{me}$ is the value of the measured electrical resistance,
 $R_0$ is a reference resistance value.

12. Method according to claim 9, wherein a combined state of phase value ($SOP_{flow}$, $SOP_{return}$) are determined as follows:

$$SOP_{flow}, SOP_{return} = \beta \cdot SOP_T + (1-\beta) \cdot SOP_E$$

wherein
 $\beta$ is a coefficient relating to a weighting value for a specific phase change material which provides the most accurate prediction of an enthalpy-based state of phase measurement, wherein $\beta$ is determined as follows:
 If $T_{me} > (T_{eq}+u(+))$, $\beta=1$,
 If $T_{me} < (T_{eq}-u(-))$, $\beta=1$,
 If $T_{me} \geq ((T_{eq}-u(-))$ and $\leq (T_{eq}+u(+))$, $\beta$ is in a range of $>0$ and $<1$, or in a range of 0.01 to 0.8, or in a range of 0.05 to 0.6, or in a range of 0.10 to 0.4, or in a range of 0.15 to 0.3, or equal to 0.2, wherein $T_{me}$ is the value of the measured temperature, $T_{eq}$ is a phase change temperature of the phase change material, u(+) is a temperature deviation from an equilibrium temperature at an upper limit of a phase change regime during a phase change process, u(−) is the temperature deviation from an equilibrium temperature at a lower limit of a phase change regime during another phase change process.

13. Method according to claim 8, wherein the sensor system is located upstream of the at least one indoor heat exchanger, wherein the system comprises a second sensor system located downstream of the at least one indoor heat exchanger, wherein the second sensor system comprises or consists of a temperature sensor and an electrical resistance sensor realized as two separate sensors or as one combined temperature-and-electrical-resistance sensor, wherein the method comprises i) obtaining temperature information from the sensor system and second sensor system and obtaining electrical resistance information from the sensor system and second sensor system;

ii) determining a state of phase difference (ΔSOP) of the heat transfer fluid across the at least one indoor heat exchanger based on the obtained temperature information and obtained electrical resistance information, and iii) controlling the operation of the heat transfer system based on the determined state of phase difference (ΔSOP), wherein, for determining a state of phase difference (ΔSOP), the method comprises a) obtaining a first temperature ($T_{me}$) of the heat transfer fluid from the sensor system and obtaining a second temperature ($T_{me}$) of the heat transfer fluid from the second sensor system;

b) obtaining a first electrical resistance ($R_{me}$) of the heat transfer fluid from the sensor system and obtaining a second electrical resistance ($R_{me}$) from the second sensor system;

c) determining a first temperature component ($SOP_T$) of a state of phase (SOP) of the heat transfer fluid from the first temperature ($T_{me}$) and determining a second temperature component ($SOP_T$) of the state of phase (SOP) of the heat transfer fluid from the second temperature ($T_{me}$);

d) determining a first electrical resistance component ($SOP_E$) of the state of phase (SOP) of the heat transfer fluid from the first electrical resistance ($R_{me}$) and determining a second electrical resistance component ($SOP_E$) of the state of phase (SOP) of the heat transfer fluid from the second electrical resistance ($R_{me}$);

e) determining a first weighted temperature component by calculating a product of the first temperature component ($SOP_T$) and a temperature coefficient (β) and determining a second weighted temperature component by calculating a product of the second temperature component ($SOP_T$) and the temperature coefficient (β);

f) determining a first weighted electrical resistance component by calculating a product of the first electrical resistance component ($SOP_E$) and a difference between 1 and the temperature coefficient (β), and determining a second weighted electrical resistance component by calculating a product of the second electrical resistance component ($SOP_E$) and a difference between 1 and the temperature coefficient (β);

g) determining the combined state of phase value ($SOP_{flow}$) by calculating the sum of the first weighted temperature component and the first weighted electrical resistance component and determining a second combined state of phase value ($SOP_{return}$) by calculating the sum of the second weighted temperature component and the second weighted electrical resistance component;

h) determining the state of phase difference (ΔSOP) of the heat transfer fluid across the at least one indoor heat exchanger by calculating the difference between the second state of phase value ($SOP_{return}$) and the first state of phase value ($SOP_{flow}$).

14. Method according to claim 8, wherein the cooling circuit comprises at least one further indoor heat exchanger, wherein a third sensor system is disposed downstream of said further indoor heat exchanger in the cooling circuit, wherein the third sensor system comprises or consists of a temperature sensor and an electrical resistance sensor realized as two separate sensors or as one combined temperature-and-electrical-resistance sensor, wherein the controller is configured to control the operation of the heat transfer system based on a further determined state of phase difference (ΔSOP) across the at least one further indoor heat exchanger by controlling a fan of the at least one further indoor heat exchanger to be switched on or off, or by controlling a flow rate of the heat transfer fluid through the at least one further indoor heat exchanger, or by controlling the flow rate of the heat transfer fluid through the at least one further indoor heat exchanger by controlling a pump rate of the pump, or by controlling an opening degree of a valve in fluid connection to said at least one further indoor heat exchanger.

\* \* \* \* \*